(12) United States Patent
Edmonds

(10) Patent No.: US 9,720,818 B2
(45) Date of Patent: Aug. 1, 2017

(54) SCALABLE, DISTRIBUTED, FAULT-TOLERANT TEST FRAMEWORK

(71) Applicant: NetApp, Inc., Sunnyvale, CA (US)

(72) Inventor: Michael David Edmonds, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/844,795

(22) Filed: Sep. 3, 2015

(65) Prior Publication Data
US 2017/0068613 A1    Mar. 9, 2017

(51) Int. Cl.
*G06F 9/44* (2006.01)
*G06F 11/36* (2006.01)

(52) U.S. Cl.
CPC ................. *G06F 11/3688* (2013.01)

(58) Field of Classification Search
CPC .................................................. G06F 11/3688
USPC .................................................. 717/123–129
See application file for complete search history.

(56) References Cited

U.S. PATENT DOCUMENTS

| | | | | |
|---|---|---|---|---|
| 6,138,112 A * | 10/2000 | Slutz | ................ | G06F 11/3672 707/748 |
| 6,671,873 B2 * | 12/2003 | Milobinski | .............. | G06F 8/43 714/38.1 |
| 6,701,514 B1 * | 3/2004 | Haswell | .............. | G06F 11/3664 707/999.102 |
| 7,111,307 B1 * | 9/2006 | Wang | ................ | G06F 11/3668 711/152 |
| 7,958,495 B2 * | 6/2011 | Kelso | ................ | G06F 11/3688 717/124 |
| 8,060,864 B1 * | 11/2011 | Michelsen | ............ | G06F 9/4428 709/202 |
| 8,151,247 B2 * | 4/2012 | Wefers | ................ | G06F 11/3688 717/124 |
| 8,185,910 B2 * | 5/2012 | Swildens | ............ | G06F 11/3414 717/124 |
| 8,332,820 B2 * | 12/2012 | Hummel, Jr. | ....... | G06F 11/3409 717/124 |
| 8,392,886 B2 * | 3/2013 | Sweis | ...................... | G06F 8/74 717/124 |
| 8,429,618 B2 * | 4/2013 | Hogan | ................ | G06F 11/3688 717/124 |

(Continued)

OTHER PUBLICATIONS

Chang et al, "A Test Function with Full Controllability over Overlapping", ACM, pp. 61-62, 2011.*

(Continued)

*Primary Examiner* — Anil Khatri
(74) *Attorney, Agent, or Firm* — Cooper Legal Group, LLC

(57) ABSTRACT

A testing framework has been developed to address these issues that takes common functionality normally imported by the testing scripts on the client device and instead splits the functionality into standalone, fault tolerant, scalable services. Accordingly, the scripts can utilize the functionality through APIs and therefore test drivers executing a test or building a test environment or other testing processes may access the services through an API. Therefore, each testing client and test driver does not need to separately import the functionality and run the functionality on the memory of the client device separately. Rather, multiple tests can use these functionalities, allowing the testing services to be scaled between tests.

14 Claims, 13 Drawing Sheets

(56) References Cited

U.S. PATENT DOCUMENTS

| | | | | |
|---|---|---|---|---|
| 8,467,987 B1* | 6/2013 | Davidson | ............... | H04W 24/06 |
| | | | | 455/408 |
| 8,499,286 B2* | 7/2013 | Lawrance | ............ | G06F 11/3672 |
| | | | | 379/10.01 |
| 8,527,953 B2* | 9/2013 | Grechanik | ........... | G06F 11/3672 |
| | | | | 715/762 |
| 8,539,252 B2* | 9/2013 | Dellow | ................. | H04L 9/0637 |
| | | | | 380/277 |
| 8,745,590 B2* | 6/2014 | Mujeeb | ............... | G06F 11/3688 |
| | | | | 717/124 |
| 8,893,087 B2* | 11/2014 | Maddela | .................... | G06F 8/70 |
| | | | | 714/745 |
| 8,954,934 B1* | 2/2015 | Cohen | ................. | G06F 11/3672 |
| | | | | 717/124 |

OTHER PUBLICATIONS

Bertolino et al, "Deriving Test Plans from Architectural Descriptions", ACM, pp. 220-229, 2000.*
Ridene et al, "A Model-Driven Approach for Automating Mobile Applications Testing", ACM, pp. 1-7, 2011.*
Rojas et al, "Cloud-Based Mobile App Testing Framework: Architecture, Implementation and Execution", ACM, pp. 1-10, 2016.*
Garousi et al, "Test Automation Not Just for Test Execution", IEEE, pp. 90-96, 2017.*
Ammar et al, "Enhanced Weighted Method for Test Case Prioritization in Regression Testing Using Unique Priority Value", IEEE, pp. 1-6, 2016.*
Yuan et al, "Design and Development of Data Security Automatic Testing System on Public Cloud", IEEE, pp. 992-995, 2016.*

* cited by examiner

SCALABLE, DISTRIBUTED, FAULT-TOLERANT TEST FRAMEWORK

FIELD

The present disclosure relates generally to software test automation tools.

BACKGROUND

Testing Software

Increased software complexity mandates large expenditures of time and resources for testing. This is to ensure that the developed software meets the requirements that guided its design and development, responds correctly to all kinds of inputs, performs its functions within an acceptable time, is sufficiently usable, can be installed and run in its intended environment, and achieves the general results desired.

Testing can be performed at the system level, or the function level. Generally, system level testing (may also be referred to as systemic testing) is the testing/verification of the software product in its entirety. System tests can be run on a variety of product features to verify that they interact properly and/or do not cause any disruption to one another. Stress and scale testing can fall into the system level test umbrella. Stress and scale testing focus on load testing and finding breaking points in the software. By comparison, functional testing is typically small in scale and narrow in scope, but is more exhaustive, covering every permutation of a particular feature of the software. Functional testing is specific to a particular feature irrespective of the system as a whole.

Test automation tools attempt to reduce the time and cost of software testing, for example by tackling repetitive tasks such as regression testing in an efficient manner. However, test automation applications can lack a unified, comprehensive test framework that allows testers to execute/write/share scalable tests. Moreover, groups of developers writing tests to scale out can find it increasingly more difficult to ramp up their testing. Typically, each test process contains all the functionality it needs to run its test, and that functionality comes at a price of memory, OS (operating system) compatibility, and startup time. In some testing models, the memory footprint of a test grows due to increased functionality, the addition of processes to keep up with scaling demand, and poor programming practices (large library dependency and/or having code where efficiency was not a concern). There are other problems as well. For example, command line interface connections can become limited (due to the sheer number of tests using them) and without rethinking their management and exploiting the protocols, erroneous failures will cause more frustration to test engineers. Coordinating triage data (test log files) is becoming more and more cumbersome and multifaceted, as test complexity grows. Test code is written to be compatible with the execution language although it is not always right for the job. Coordinating and controlling the communication between many processes, involved in a scalable test, is too complex and burdensome to maintain in the test script. Event driven techniques require more transparency to the user where things are happening but there is no dependency on who will see the events or where the actions are taking place.

Background on Example Devices for Testing—Storage Filers

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Storage Operating System

As used herein, the term "storage operating system" generally refers to the computer-executable code operable on a computer that manages data access and may, in the case of a filer, implement file system semantics, such as a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file.

The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks.

Physical Disk Storage

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

BRIEF DESCRIPTION OF THE DRAWINGS

The accompanying drawings, which are incorporated in and constitute a part of this specification, exemplify the embodiments of the present disclosure and, together with the description, serve to explain and illustrate principles of the disclosure. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
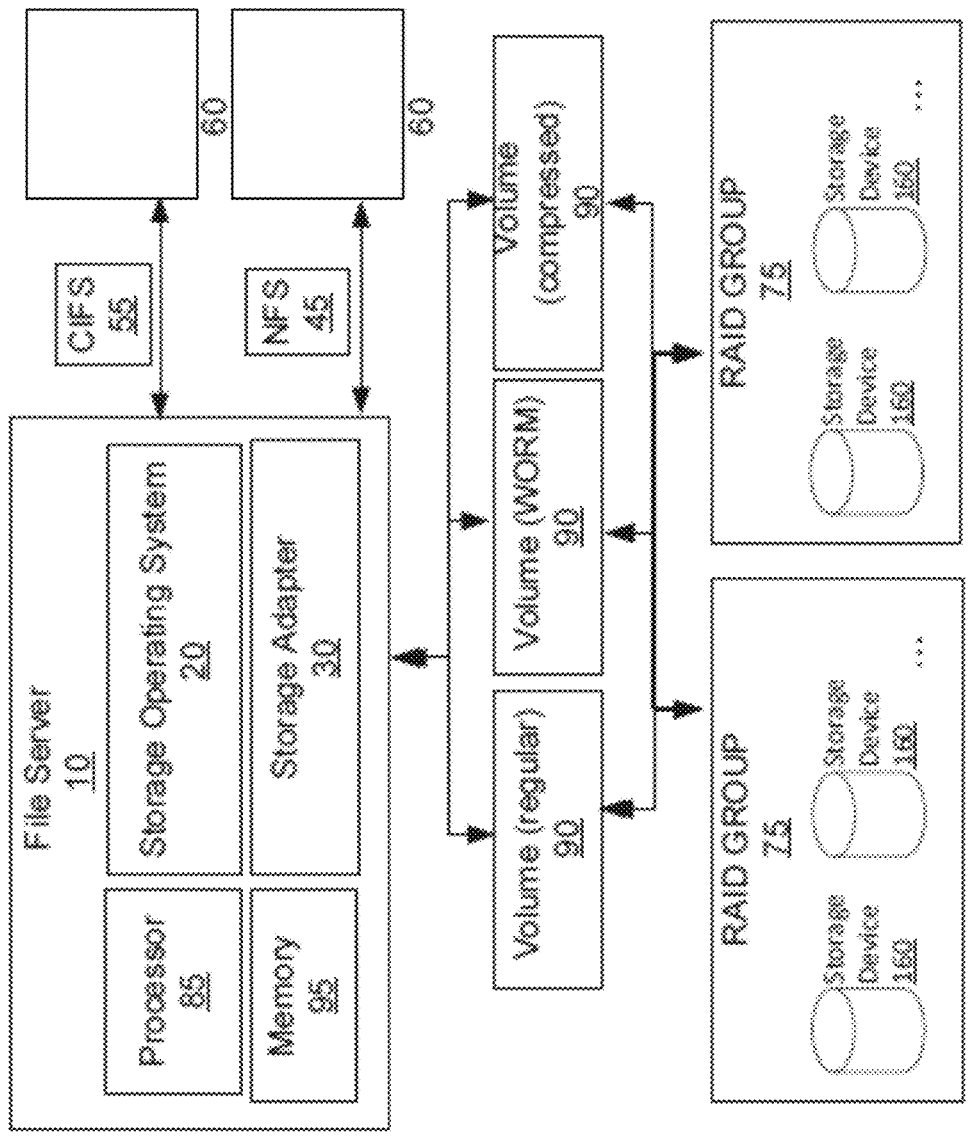
FIG. 1 depicts, in accordance with various embodiments of the present disclosure, a diagram representing a storage system.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION

Unless defined otherwise, technical and scientific terms used herein have the same meaning as commonly understood by one of ordinary skill in the art to which this disclosure belongs. One skilled in the art will recognize many methods and materials similar or equivalent to those described herein, which could be used in the practice of the present disclosure. Indeed, the present disclosure is in no way limited to the methods and materials specifically described.

Various examples of the disclosure will now be described. The following description provides specific details for a thorough understanding and enabling description of these examples. One skilled in the relevant art will understand, however, that the disclosure may be practiced without many of these details. Likewise, one skilled in the relevant art will also understand that the disclosure can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the disclosure. Indeed, certain terms may even be emphasized below; however, any terminology intended to be interpreted in any restricted manner will be overtly and specifically defined as such in this Detailed Description section.

Testing Storage Filers

"Clusters" of filers—storage controllers—started out as two nodes, but have expanded to four to 24 nodes, to increase storage capacity. Accordingly, testing filers has become increasing complex and resource intensive. One possibility is to leverage the huge network of storage equipment.

Traditionally, test scripts import the functionality that they need to execute. The disclosed systems and methods instead move that functionality to a shared resource, rather than import it to the client host driving the test. Currently available testing stacks and drivers lack a unified, scalable, and extendable test. This causes engineers that need to run tests on the system or unit under test ("UUT") to come up with their own implementation of a solution that is often incompatible with other teams because of its specific nature.

It is increasingly difficult to scale out automation to keep up with distributed filer growth. For instance, as engineers add functionality to test processes, the memory footprint for test processes continues to grow. Accordingly, adding processes to keep up with scaling demand is not sustainable at the current rate. As test complexity grows, the mechanism used for inter-process communication needs to be transparent. Connections such as CLI Connections are in limited supply and without coordinating their management, erroneous failures will cause more problems. Additionally, coordinating the triage data (Logs) is becoming more and more cumbersome and complex as test complexity grows Configuration management is dealt with in various ways which makes porting tests into systemic environments difficult. There has been great effort put into test automation libraries to make them scalable, maintainable, and customizable—with limited success.

Overview

Accordingly, a testing framework has been developed to address these issues that takes common functionality normally imported by the testing scripts on the client device and instead splits the functionality into standalone, fault tolerant, scalable services. Accordingly, the scripts can utilize the functionality through APIs and therefore test drivers executing a test or building a test environment or other testing processes may access the services through an API. Therefore, each testing client and test driver does not need to separately import the functionality and run the functionality on the memory of the client device separately. Rather, multiple tests can use these functionalities, allowing the testing services to be scaled between tests.

The services 300 are broken apart into commonly used functionality such as (1) configuration services for setting up the UUT and other testing environment requirements, (2) connection services for communicating between the test driver's client and the several hosts involved, (3) monitoring services for monitoring the testing, (4) logging services for regarding the test data, (5) event services for performing an action upon an event (e.g. a data event), (6) I/O services for performing input output tests and stress loads for example, (7) and others.

Example Storage System

FIG. 1 illustrates an overview of an example of a storage system according to the present disclosure. The storage system may include a non-volatile storage such as a Redundant Array of Independent Disks (e.g., RAID system), one or more hard drives, one or more flash drives and/or one or more arrays. The storage system may be communicatively coupled to the host device as a Network Attached Storage (NAS) device, a Storage Area Network (SAN) device, and/or as a Direct Attached Storage (DAS) device.

In some embodiments, the storage system includes a file server 10 that administers a storage system. The file server 10 generally includes a storage adapter 30 and a storage operating system 20. The storage operating system 20 may be any suitable storage system to access and store data on a RAID or similar storage configuration such as the Data ONTAP™ operating system available from NetApp, Inc.

The storage adaptor 30 is interfaced with one or more RAID groups 75 or other mass storage hardware components. The RAID groups include storage devices 160. Examples of storage devices 160 include hard disk drives, non-volatile memories (e.g., flash memories), and tape drives. The storage adaptor 30 accesses data requested by clients 60 based at least partially on instructions from the operating system 20.

Each client 60 may interact with the file server 10 in accordance with a client/server model of information delivery. That is, clients 60 may request the services of the file server 10, and the file server 10 may return the results of the services requested by clients 60 by exchanging packets encapsulating, for example, Transmission Control Protocol (TCP)/Internet Protocol (IP) or another network protocol (e.g., Common Internet File System (CIFS) 55 and Network Files System (NFS) 45 format.

The storage operating system 20 implements a file system to logically organize data as a hierarchical structure of directories and files. The files (e.g. volumes 90) or other data batches may, in some embodiments, be grouped together and either grouped in the same location or distributed in different physical locations on the physical storage devices 160. In some embodiments, the volumes 90 will be regular volumes, dedicated WORM volumes 90, or compressed volumes 90.

Current Test Automation Stack

Figure 2:
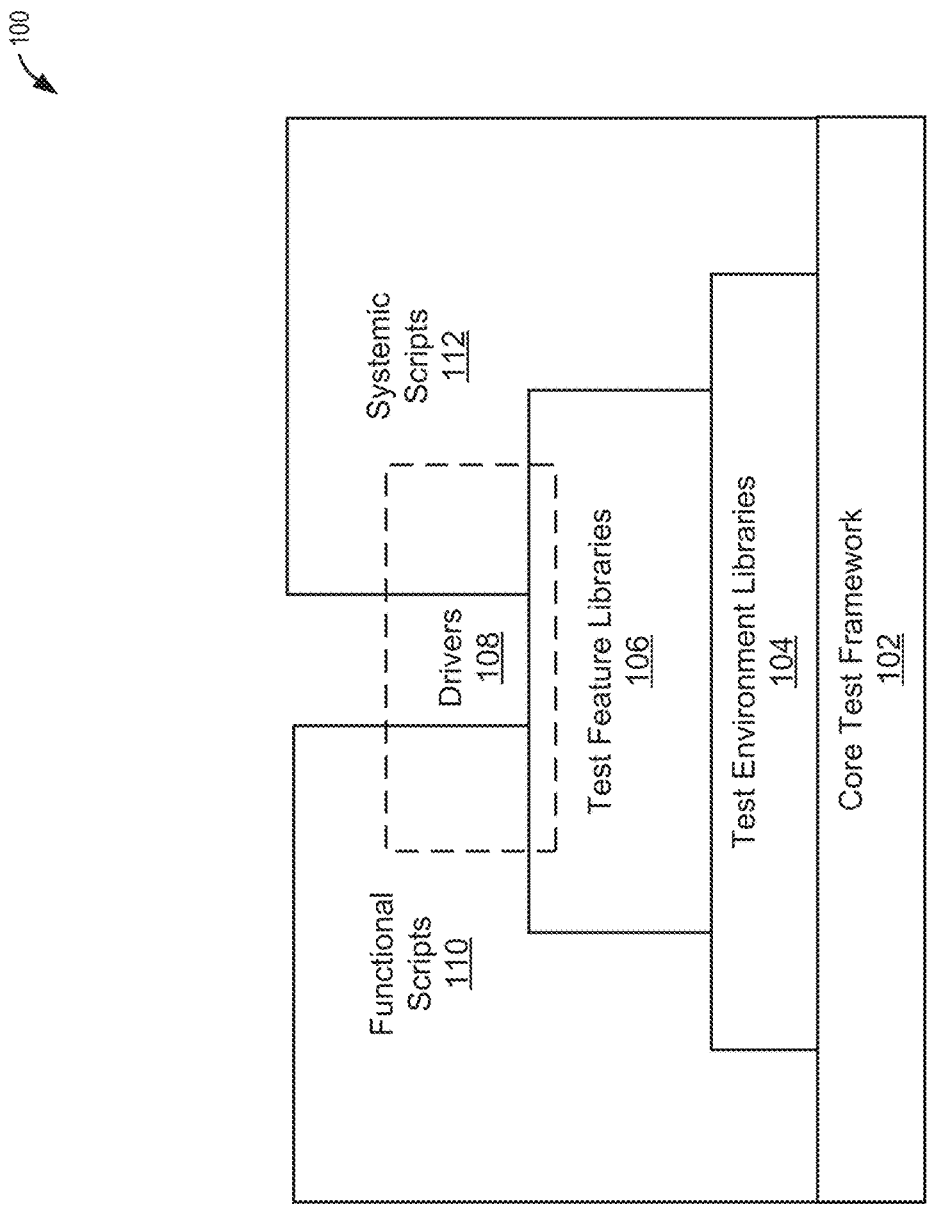
FIG. 2 depicts, in accordance with various embodiments of the present disclosure, a functional block diagram of the test framework architecture.

FIG. 2 is a block diagram illustrating an example of a conventional test automation stack 100. From top down, the stack 100 includes scripts 110 at a high level to perform the high level function calls for the test. Commonly, an engineer or other user will build scripts 110 to perform multiple test functions and provide multiple tests calls to perform the test. The scripts may be execute a series of steps that will, connect to the unit under test (UUT), setup the test environment including by configuring the UUT, and performing some actions that test certain features or stress the system. For example, the user may build scripts to test the system as a whole to verify a product entirely, including for example stress and scale testing. In stress and scale testing the scripts 110 and related software may apply various loads and processing stresses on the unit under test (UUT). In functional testing, typically tests a particular feature and every permutation of the feature.

In order to execute the tests, typically the user will execute a test driver 108. A test driver 108 is a framework for writing 1 to N test cases (a single test on a single machine) inside a single test script. Accordingly, the test driver 108 will execute each of the test cases written inside the script 110. Having a common setup and cleanup for many test cases enables user to reuse a common setup and cleanup for many test cases, while the reuse of the source code for the driver allows quality assurance teams to compare testing results more accurately and gather more accurate conclusions.

The test scripts 110 and test driver 108 may execute the functionality of the tests by drawing from testing libraries at a lower level. In some examples, those may be built of a hierarchy of libraries for implementing the testing functionality. In one example, the foundation could include a core test framework 102 that includes the core libraries that may be utilized to deliver primitives for the testing framework. At the next level, the test environment libraries 104 may include a family of automation libraries that handle everything from logging in, to performing some baseline verification of output. The test environment libraries 104 may be utilize to build a diverse set of test workflows and interactions. Finally, the test feature libraries 106 may include commonly used functionality for testing a certain set of features (e.g. failover modules).

Accordingly, when a current test driver 108 executes a test, much of the functionality in these various libraries must be imported to the test processes running on local clients. Therefore, the tests run on large system (e.g. distributed storage systems) have an increasingly higher overhead, as the functionality used for testing, the number UUTs, and the remote nature of the UUTs make coordination of the utilization of these features at each machine increasingly expensive in terms of memory and bandwidth.

Service Based Test Automation System

Accordingly, the inventors have developed a service based testing system and automation framework which divides many of the common features or functionality of testing framework 100 and puts them on separate services stored on the cloud for scalable coordination of the execution of tests. Accordingly, with this model, the features and functionality do not need to be imported and every local client or host where they are being utilized. Rather, than can be used on demand on servers and execute multiple requests for different tests and different products to scale their use.

Figure 3:
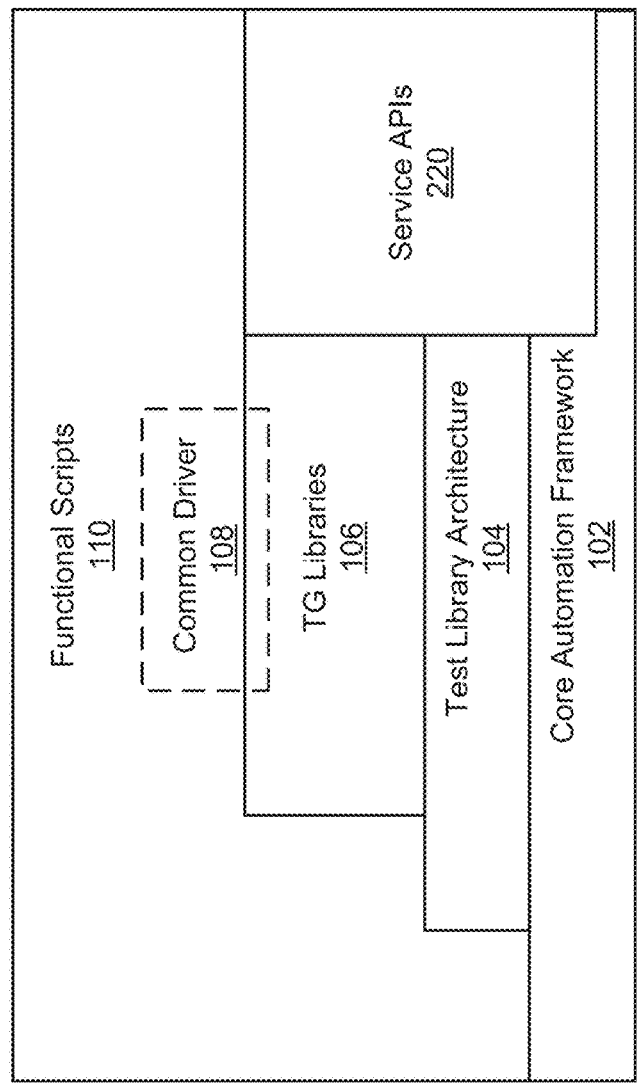
FIG. 3 depicts, in accordance with various embodiments of the present disclosure, a functional block diagram of the test framework architecture using tests managed from the same client.

Accordingly, to implement the services model, FIG. 3 illustrates a new test framework 100 stack. In this example, the test framework stack 100 utilizes a common driver 108 to call functionality through APIs 220 rather than importing the functionality. Accordingly, the common driver 108 is built to include common functionality services through the service APIs 220. Therefore, the driver 108 utilized for tests that coordinate the services must be the same or built on the same foundation for coordinating the services through standard calls and communications through the service APIs 220.

Figure 4:
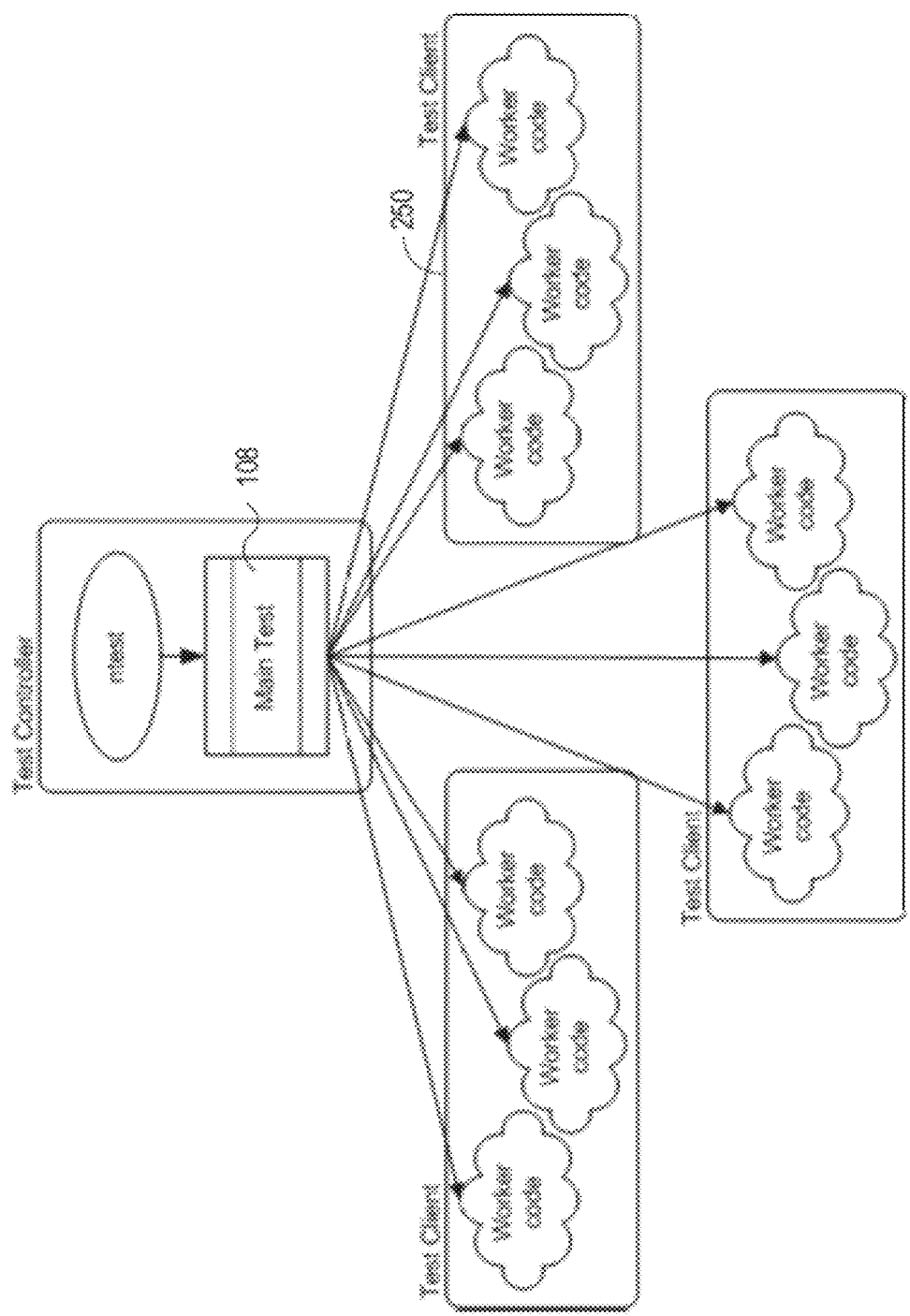
FIG. 4 depicts, in accordance with various embodiments of the present disclosure, a flow chart of the test framework architecture using local supervisor test drivers.

As illustrated in FIG. 4, in the current system, the driver 108 must coordinate testing across multiple units under test ("UUTs") 250. Therefore, this requires one process to manage each of the testing processes remotely on all of the UUTs 250. This is because without standard functionality or a service based testing framework, the driver 108 does not include functionality to send some of the testing functionality to each separate UUT 250. Rather, the driver 108 running on the client testing controller must separately control the testing process remotely on each UUT 250. Accordingly, this quite an inefficient model and leads to a large memory footprint and bottleneck problems of communication with the client controller. For example, if the driver 108 is to control 50 separate tests on 500 separate machines, the driver 108 must supervise the testing on 25,000 remote processes.

Figure 5:
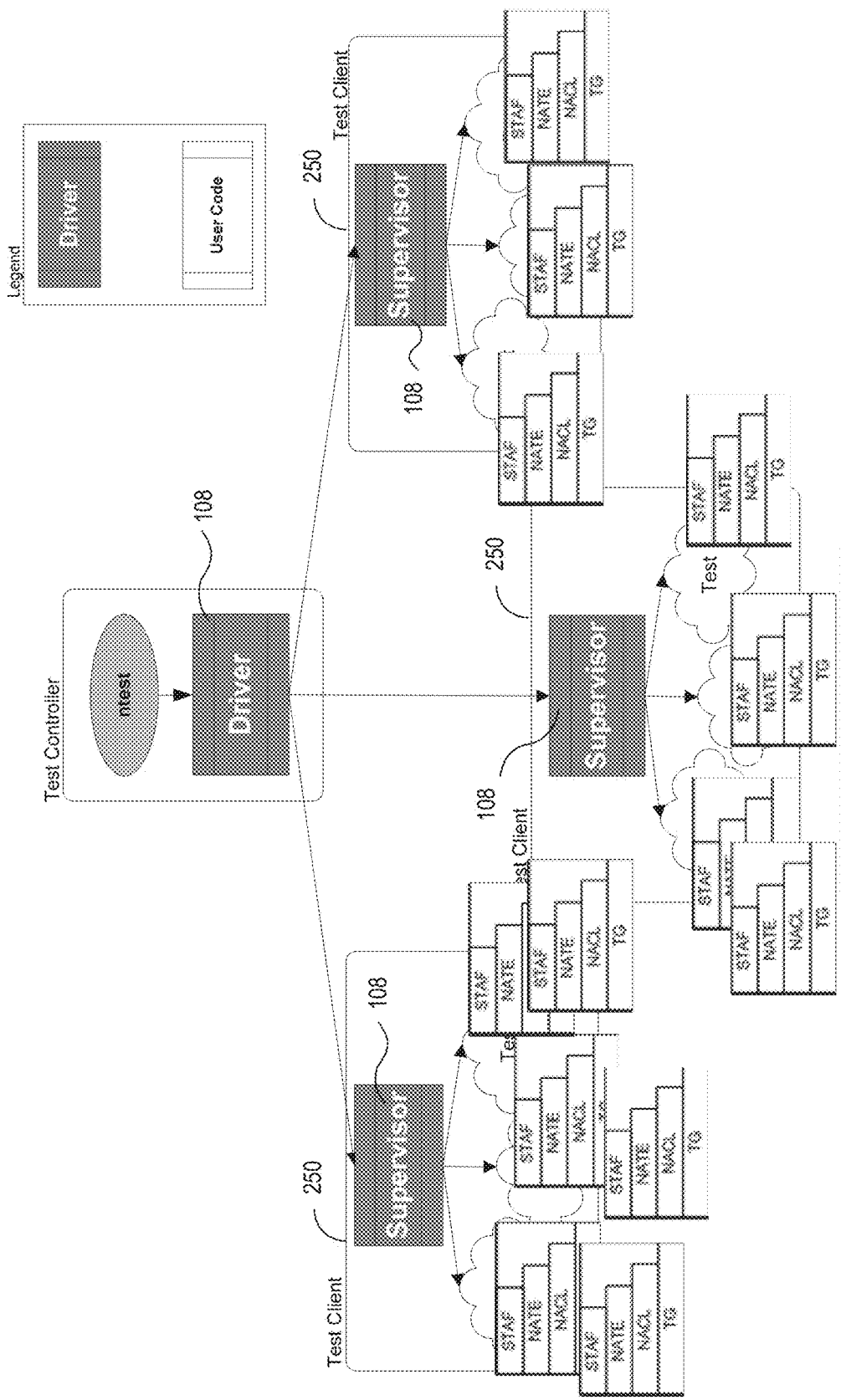
FIG. 5 depicts, in accordance with various embodiments of the present disclosure, a flow chart of the test framework architecture using local supervisor test drivers and services on servers.

However, as illustrated in FIG. 5, the inventors have developed a tiered testing management model with the service based testing framework. The drivers 108 may utilize a tiered distribution model for coordinating the implementation of tests across remote UUTs 250. For example, a main driver 108 or manager may spawn supervisor drivers 108 on each local machine or UUT 250 for implementing the tests. Then, for each test case performed on each local machine or UUT, 250 a worker process may be spawn for perform the individual test. Accordingly, the service based model allows the testing processes to be efficiently coordinated among the UUTs using the service based model.

As illustrated in this embodiment, even with the distributed supervisors 108, without the services 300, each supervisor drive 108 must import the library functionality entirely to the local UUT server or other test client to perform individual tests. Accordingly, his process is quite inefficient without the provision of scalable services.

Figure 6:
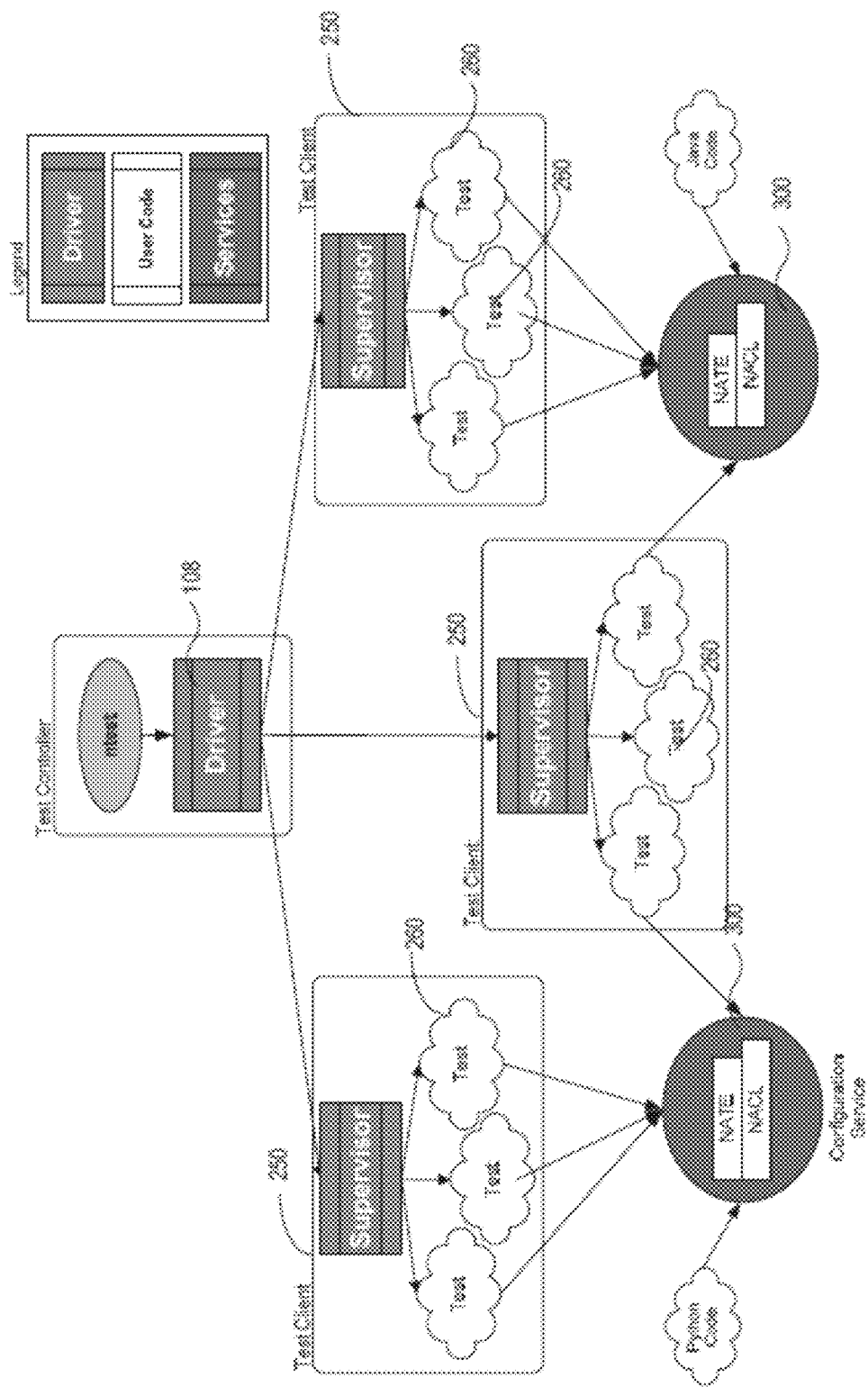
FIG. 6 depicts, in accordance with various embodiments of the present disclosure, a schematic diagram of the test framework architecture using local supervisor test drivers and services on servers.

FIG. 6 illustrates an example of how the services 300 are called and interact with the entire system including the supervisor driver 108. For instance, as illustrated in FIG. 5, here also the driver 108 coordinates the implementation of supervisor drivers 108 on each UUT 250. And each supervising driver 108 on each test unit may then perform individual test cases 260. As illustrated, the test cases 260 executed by the supervising driver 108 may call on or import through a service API 220 functionality from services 300 to perform each test (e.g. MCC Lifecycle or Configuration services as will be explained in further detail). Accordingly, this distributed model is advantageous because not only does the driver 108 executing the test primarily run on the local UUT 250, but each service 300 utilized by each separate test 260 may be separately called by the supervising driver 108 for each individual UUT 250. Accordingly, this is extraordinarily more efficient than a host driver 108 or main driver driving the processes, calling the services and coordinating the tests 260 on each individual UUT 250.

Services on Server Based Architecture

Figure 7:
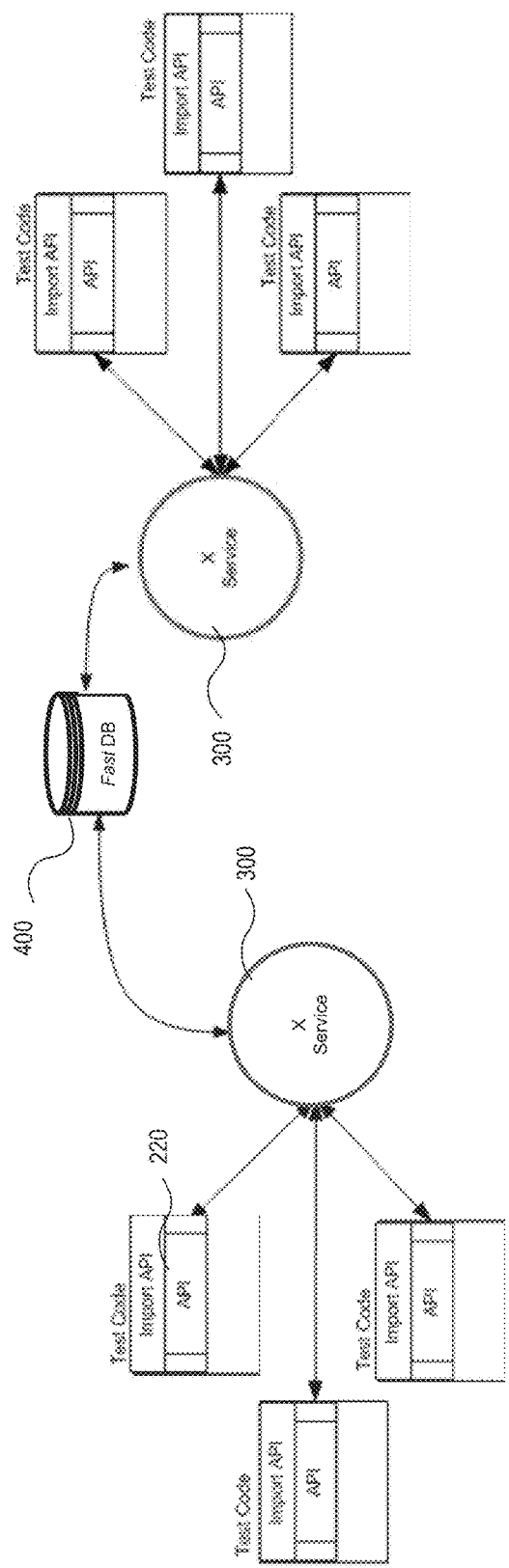
FIG. 7 depicts, in accordance with various embodiments of the present disclosure, a schematic diagram of the test framework architecture using services on servers.

FIG. 7 illustrates an example of a system and methods for implementing the server based services 300 that supply the reusable functionality for each of the tests 260. Accordingly, as illustrated the services 300 may be separate modules or software code applications stored in a database 400. Accordingly, as the separate drivers 108 on each UUT 250 that are executing a test 260 require functionality based on their testing scripts 110, they may import an API 220 and then utilize the API 220 to communicate and acquire the functionality from the service 300. Accordingly, the services 300 may be stored in a central location such as a server or other computing device as disclosed herein that may be accessed by any of the individual UUTs 250 and thereby perform the functions for each test 260.

Figure 8:
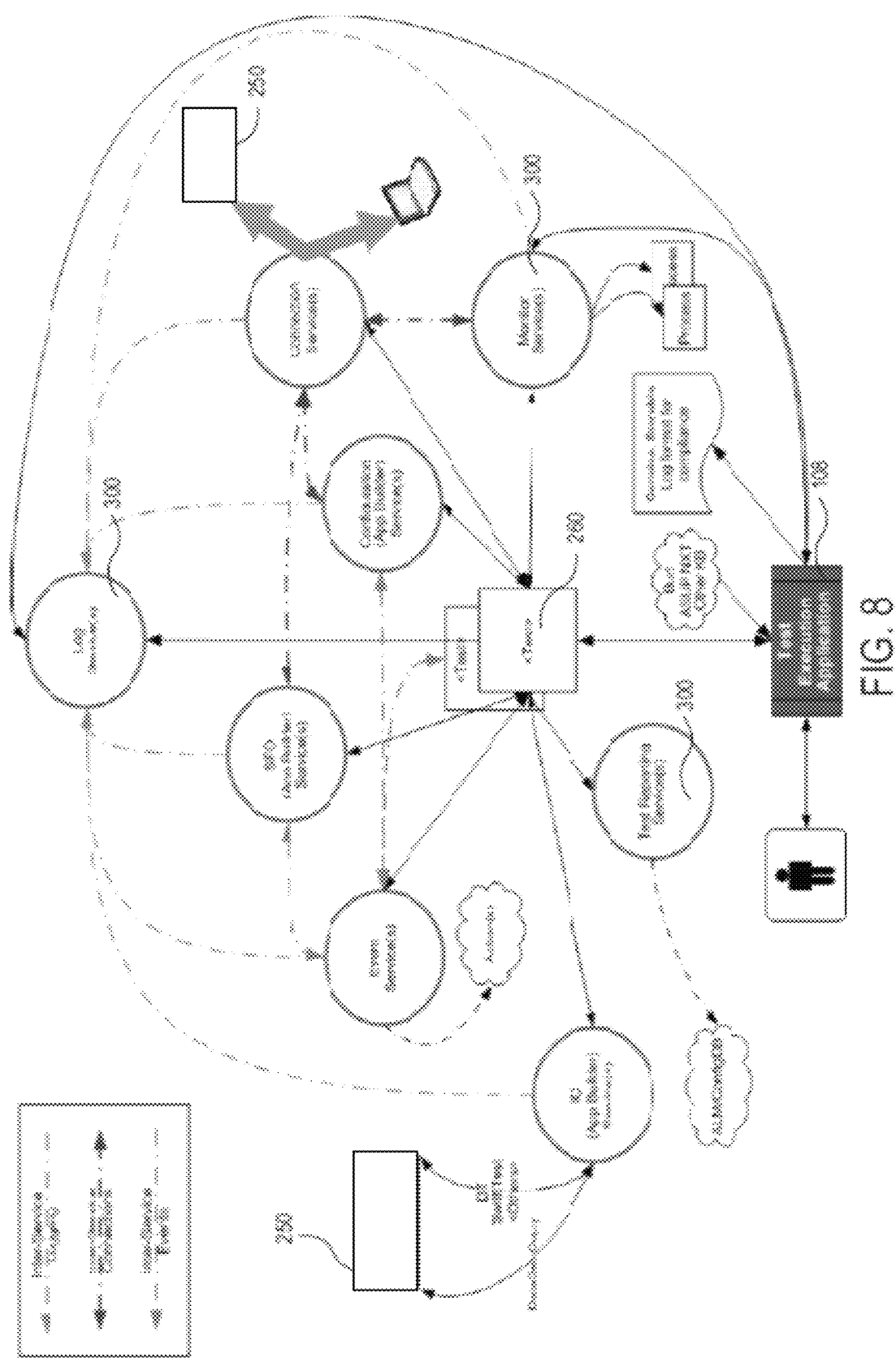
FIG. 8 depicts, in accordance with various embodiments of the present disclosure, a schematic diagram of the test framework architecture using services on servers.

FIG. 8 illustrates an overview of an overall system for testing different UUTs using services 300. The various services that may be utilized include:

Connection Services
Configuration Services
Monitoring Services
Event Services
Monitoring Services
SFO Services
Test Reporting Services
IO Services
Log Services Accordingly, each individual UUT and/or test executed may be able to access a server or servers with a suite of testing services, including for example, the services listed above. These services will provide (through an API as described above) the common functionality utilized in many tests. The test execution application will have an interface for employing the functionality more efficiently and repeatably.

As illustrated, the connection services 300 may be utilized to connect the UUT 250 to the test execution application 108 and other components necessary for the test 260. As the test execution application 108 is run by a user, the many services 300 may be called and data extracted from them or analysis of data performed from the UUT 250. For instance, as illustrated the input/output services 300 (I/O) may run tests on the UUT 250 to determine the loads that may be experienced or managed utilizing certain testing services. Additionally, a log service 300 may log data from each of the separate services 300 and the test itself 260.

EXAMPLES

Figure 9:
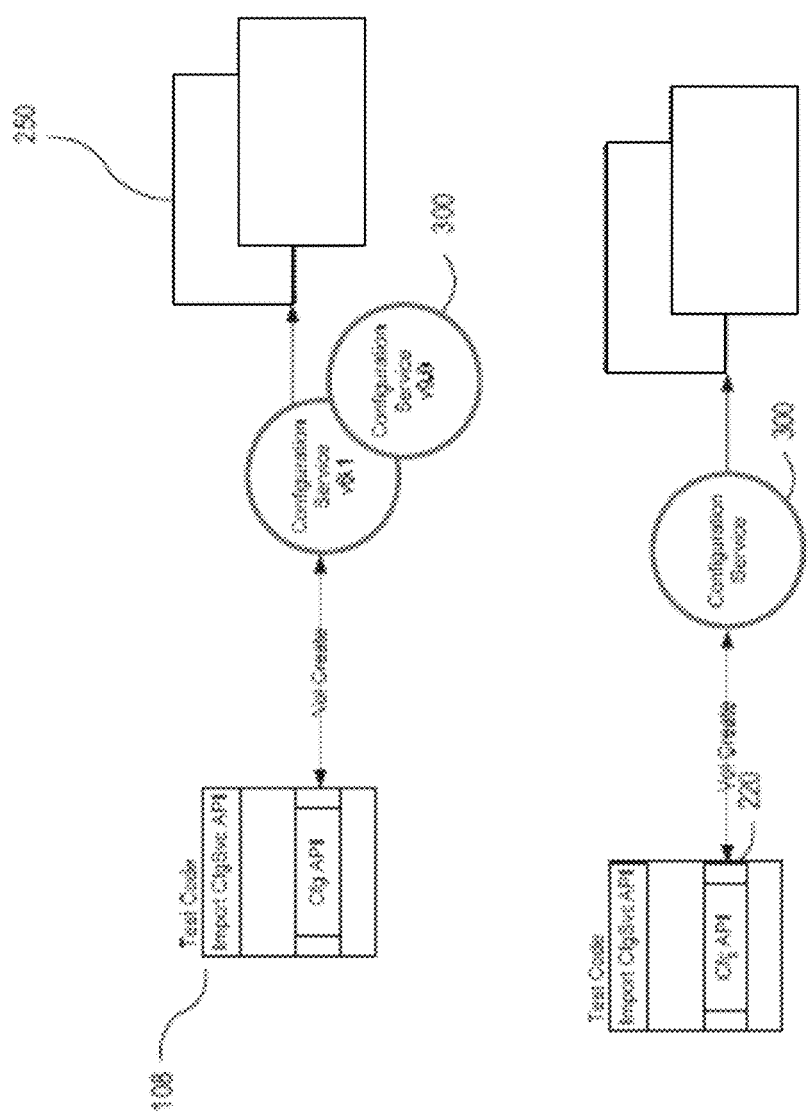
FIG. 9 depicts, in accordance with various embodiments of the present disclosure, a schematic diagram of the test framework architecture using services on servers.

FIG. 9 illustrates an example of how the test execution application may utilize a configuration service 300 to properly configure a UUT 250 for testing. The configuration service may be called by the test execution application 108 and an API 220 from the service 300 may then be downloaded to the local client executing the test application. For example, the test execution application 108 may have standard calls for enrolling the configuration service 300 to configure UUTs 250 for certain types of testing. Once the call is made, the test code driver 108 may send a request to the known location of the configuration service 300 to download the API 220 for the configuration service. Then, in response to the request, the server hosting the configuration service 300 may send the API 220 to the test client. Once the test 108 imports and installs the API 220, or runs the API 220 as a script, the test execution application 108 can issue abbreviated calls to the configuration service 300 to configure a UUT 250 for certain tests. These calls, for example, could prepare a UUT 250 for a failover test by copying volumes of real data and creating a new volume with that data to a new location on the UUT 250. These processes could easily be triggered with a standard call through the API 220 with certain parameters to the configuration service 300.

In order to perform operations on the UUT 250, the configuration service may connect to a UUT 250 using a connection service 300 or other methods. After connecting to the UUT 250, the configuration service 300 may set these certain parameters or manipulate data in a certain fashion in order to set up the UUT 250 for testing. For instance, for a failover test, the configuration service 300 may copy a set of real data on the UUT to a new location to serve as the test data. Then the test service might automatically set the UUT 250 up for a failover test or other type of test.

Once the API 220 is downloaded, the test execution application 108 can provide minimal instructions to instruct the configuration service to set up the UUT 250 for a certain types of tests. This will, for example, simplify the process of setting up the UUT 250 for testing, and will not require the engineer to write code for configuring the UUT 250 in common ways for common types of testing (e.g. failover, load testing). Any specifics that vary between tests can be specified by the engineer in the test execution application. However, the amount of coding then will be relatively low compared to coding a test execution application from scratch each time.

Figure 10:
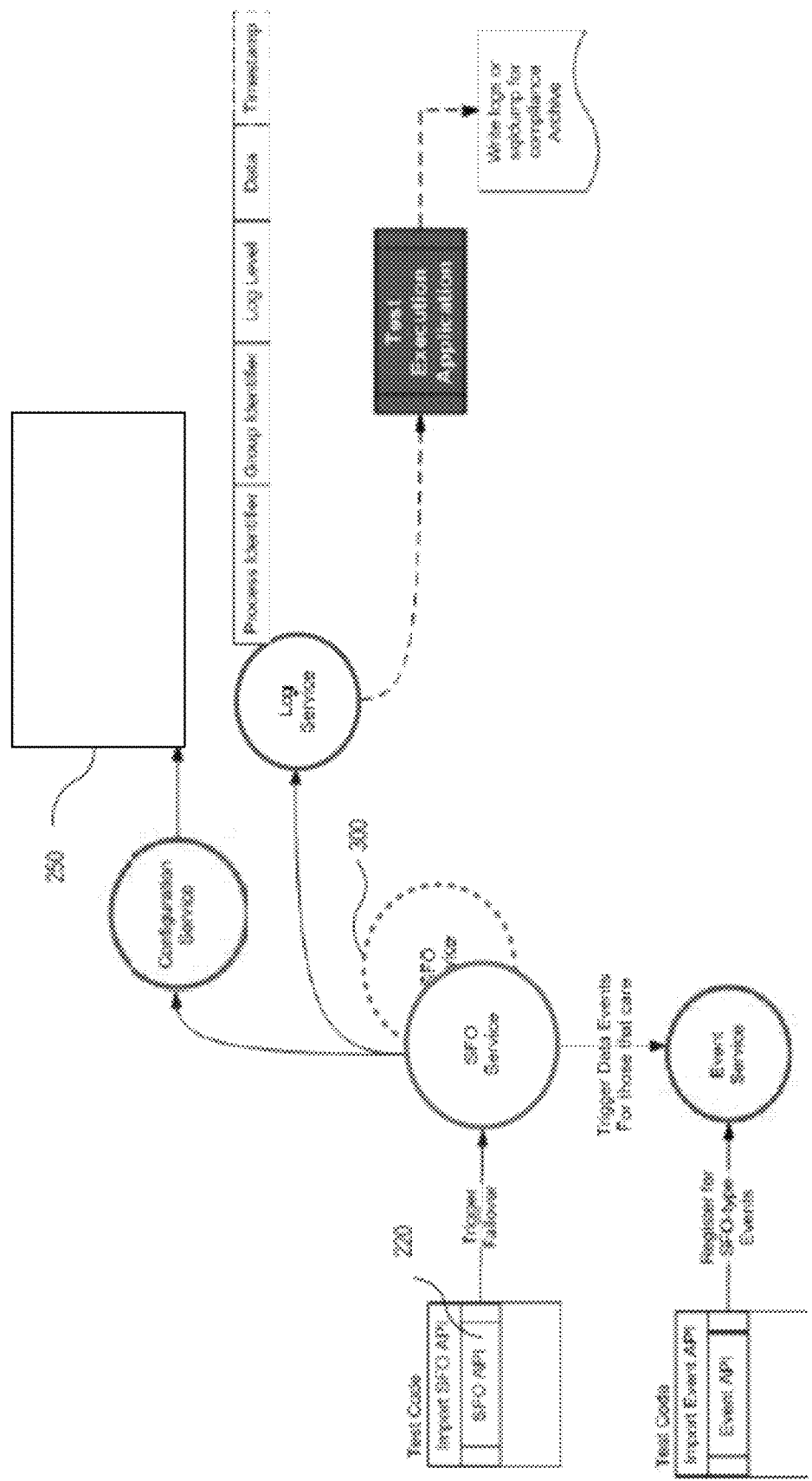
FIG. 10 depicts, in accordance with various embodiments of the present disclosure, a schematic diagram of the test framework architecture using services on servers.

As another example, FIG. 10 illustrates an implementation of a SFO service 300 and how it will be utilized with other services 300 during a test. For example, once the configuration service 300 has set up the UUT 250 for a failover test, the remaining services 300 may then perform the failover test and log and report the events. Accordingly, as illustrated, the test execution application 108 may first have code for executing a test that utilizes an SFO service 300, and therefore will first import the SFO API 220. Then, the SFO API 220 may trigger a failover event on the UUT 250, which is coordinated through the event service 300 and other services 300. The log service 300 would then record the results of the failover test.

Figure 11:
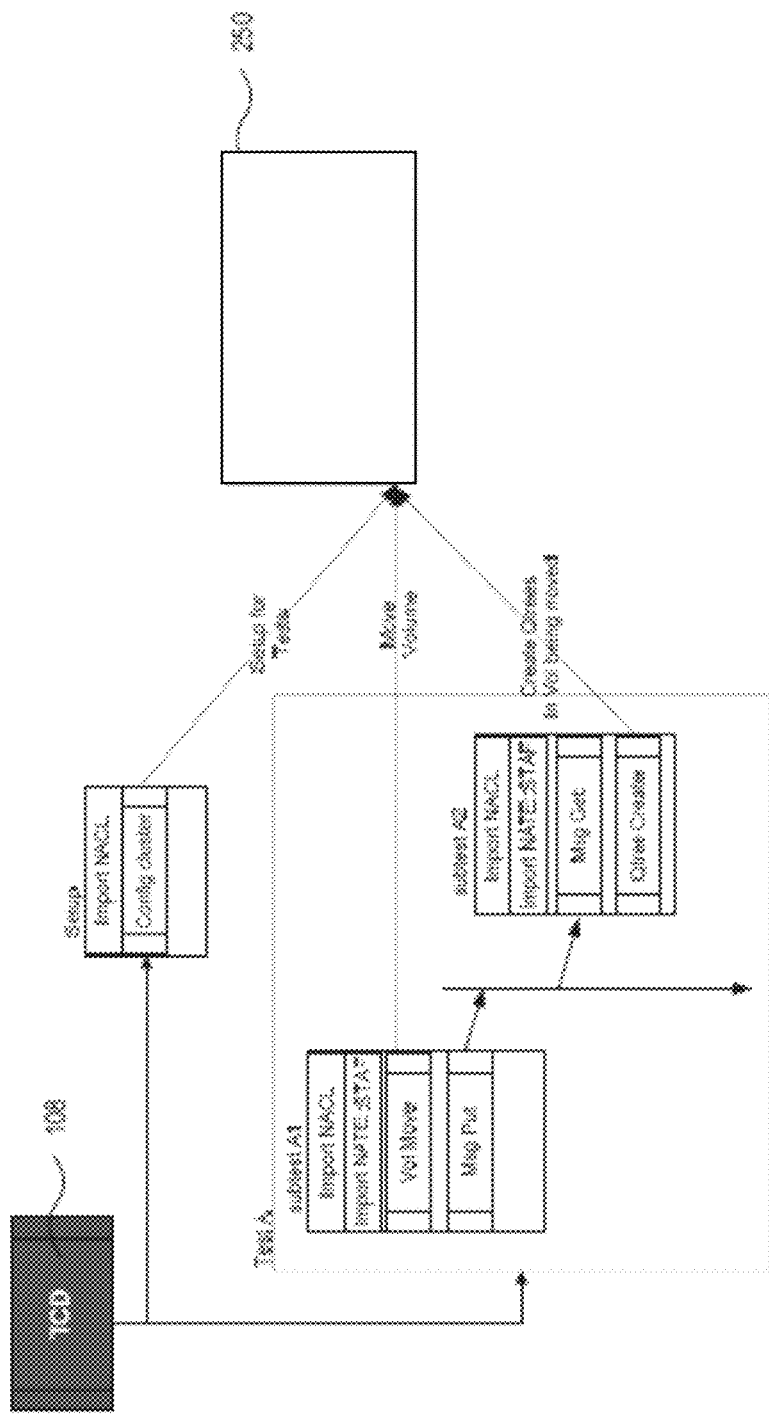
FIG. 11 depicts, in accordance with various embodiments of the present disclosure, a flow chart illustrating an example test execution.

FIG. 11 illustrates an embodiment of a test execution application 108 executing a test without access to scalable services. As illustrated, the test execution application 108 must first configure or setup the UUT 250 rather than directing a call to the configuration service 300. Rather, the setup process involves importing libraries (e.g. NACL) for configuring the UUT 250, and for importing the test code to perform the entire test, which will be have to run on the resources of the client or other computing device that is executing the test execution application, which consumes a lot of overhead.

Figure 12:
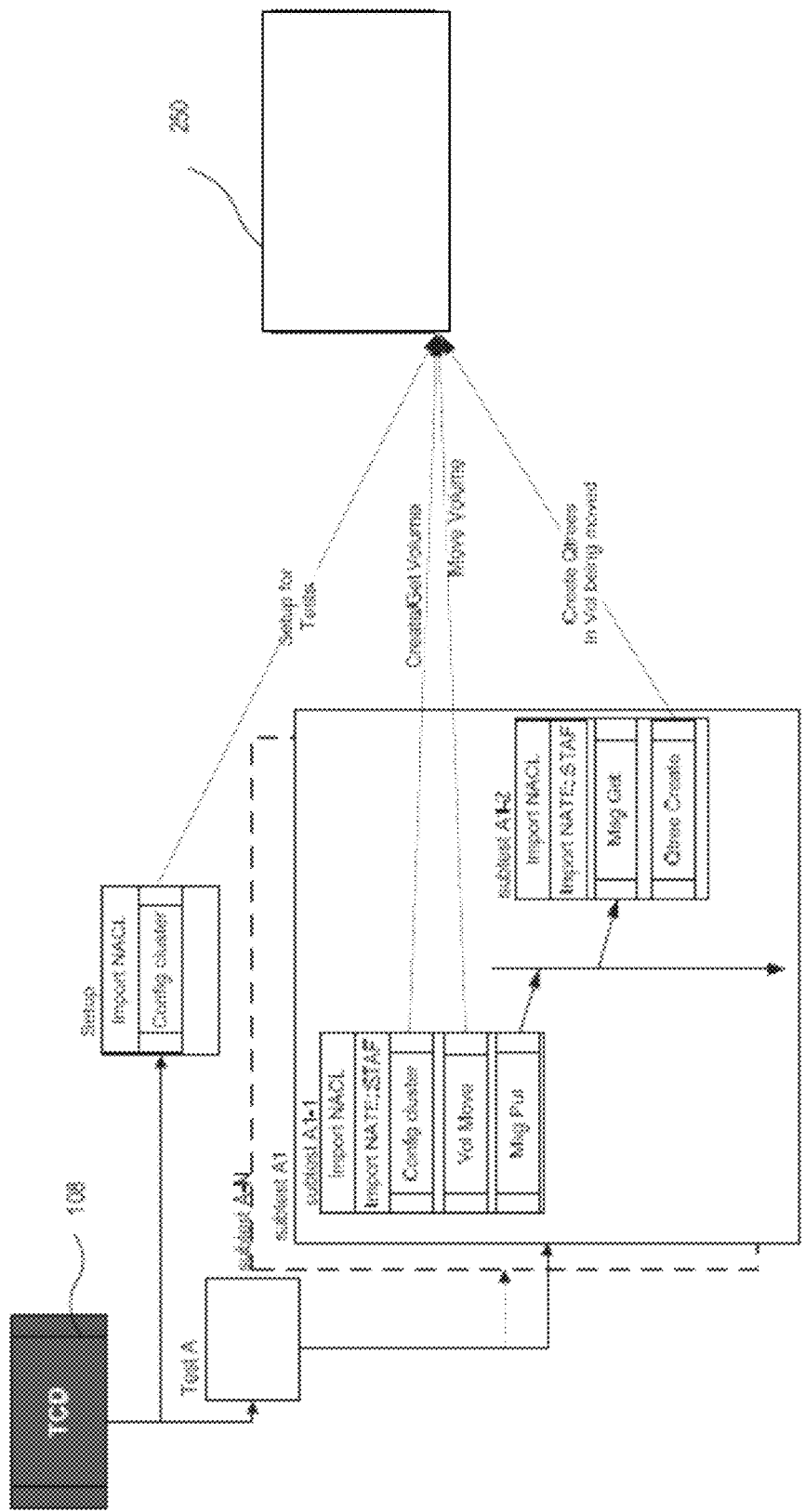
FIG. 12 depicts, in accordance with various embodiments of the present disclosure, a flow chart illustrating an example test execution.

FIG. 12 further illustrates this concept during execution of test, where each of the functions is being performed by code written by an engineer and executed by the test execution application 108 locally. This also illustrates how much overhead a single test can utilize without implementation of the services 300 architecture as described herein. Accordingly, each subtest and sub part of the subtest requires important of certain libraries and functionality.

Figure 13:
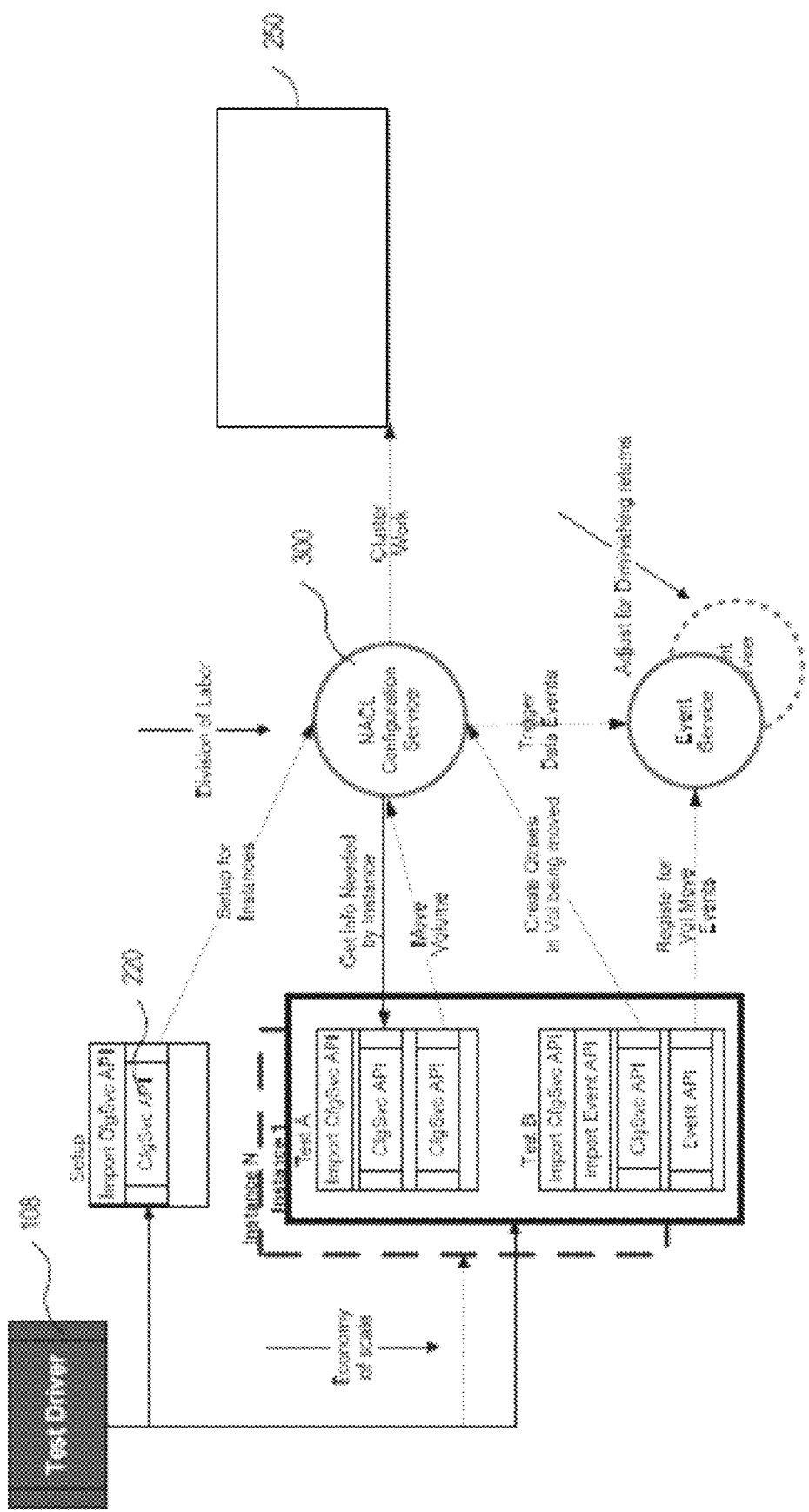
FIG. 13 depicts, in accordance with various embodiments of the present disclosure, a flow chart illustrating an example test execution using services on servers.

FIG. 13 illustrates how the services 300 architecture disclosed herein can allow the tests illustrated in FIGS. 11-12 to scale efficiently for each sub-test and for additional tests and UUTs 250. For instance, as illustrated, the test driver 108 can call multiple services based on test code to setup and execute a test of a UUT 250. For instance, the test code 108 may have a setup function that imports the configuration service API 220 and then sends call to the configuration service 300 in order to setup the UUT 250 for a failover test for example.

As illustrated in FIG. 13, economies of scale may be gained by the code importing APIs for services 300 that will be needed for multiple tests (e.g. Test A, Test B). As illustrated, most of the processing is done on the servers that host the services 300, and basic function calls and other parts are performed by the local execution application 108. Therefore, as illustrated, the overhead utilized on the client application is minimized and can be shared with other test execution applications 108 that also have access to the services 300. Accordingly, this will dramatically lower the overhead utilized for companies executing large amounts of tests on UUTs 250.

CONCLUSIONS

It will be understood to those skilled in the art that the techniques described herein may apply to any type of special-purpose computer (e.g., file serving appliance) or general-purpose computer, including a standalone computer, embodied as a storage system. To that end, the filer can be broadly, and alternatively, referred to as a storage system.

The teachings of this disclosure can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present disclosure, but merely be understood to illustrate one example implementation thereof.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The various methods and techniques described above provide a number of ways to carry out the disclosure. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A method, comprising:
receiving, at a device from a first client device, a request for first functionality for performing a test of a storage controller,
wherein the first functionality comprises configuration functionality including processes for preparing a data structure on the storage controller to perform a failover test, wherein the preparing the data structure comprises copying a volume of data to create a new volume to be used for the failover test;
sending to the first client device an application programming interface (API) for the first functionality, wherein the API is populated with API functionality used to invoke performance of the failover test for the storage controller;
receiving, from the API that is at the first client device, a test request to perform the failover test to test the storage controller; and
executing the test request to perform the failover test by copying data from a first location to a new location as test data for use by the failover test and invoking the storage controller to perform a failover utilizing the test data.

2. The method of claim 1, wherein a test script is utilized for performing the failover test.

3. The method of claim 1, wherein the new volume is used as test data.

4. The method of claim 1, wherein the device receives a second request for the first functionality from a second client device.

5. The method of claim 4, wherein the device sends the API for the first functionality to the second client device.

6. A non-transitory machine readable medium having stored thereon instructions for performing a method, which when executed by machine, causes the machine to:
send, from a client device to a device, a request for a first service to perform a test, associated with first functionality, of a storage controller,
wherein the first functionality comprises configuration functionality including processes for preparing a data structure on the storage controller to perform a failover test, wherein the preparing the data structure comprises copying a volume of data to create a new volume to be used for the failover test;
import an application programming interface (API) for the first service from the device, wherein the API is populated with API functionality used to invoke performance of the failover test for the storage controller; and
sending a test request through the API to the device to request the first service to perform the failover test by copying data from a first location to a new location as test data for use by the failover test and invoke the storage controller to perform a failover utilizing the test data.

7. The method of claim 6, wherein a test script is utilized for performing the failover test.

8. The method of claim 6, wherein the new volume is used as test data.

9. The method of claim 8, wherein the client device imports a second API for a second functionality.

10. A computing device comprising:
a memory containing machine readable medium comprising machine executable code having stored thereon instructions for performing a method;
a processor coupled to the memory, the processor configured to execute the machine executable code to cause the processor to:
receive, from a first client device, a request for first functionality for performing a test of a storage controller,
wherein the first functionality comprises configuration functionality including processes for preparing a data structure on the storage controller to perform a failover test, wherein the preparing the data structure comprises copying a volume of data to create a new volume to be used for the failover test;
send to the first client device an application programming interface (API) for the first functionality, wherein the API is populated with API functionality used to invoke performance of the failover test for the storage controller;
receive, from the API that is at the first client device, a test request to perform the failover test to test the storage controller; and
execute the test request to perform the failover test by copying data from a first location to a new location as test data for use by the failover test and invoking the storage controller to perform a failover utilizing the test data.

11. The method of claim 10, wherein a test script is utilized for performing the failover test.

12. The method of claim 10, wherein the new volume is used as test data.

13. The method of claim 10, wherein the device receives a second request for the first functionality from a second client device.

14. The method of claim 13, wherein the device sends the API for the first functionality to the second client device.

* * * * *